United States Patent
Aiba

(10) Patent No.: US 8,483,558 B2
(45) Date of Patent: Jul. 9, 2013

(54) IMAGE PICKUP APPARATUS CAPABLE OF EFFICIENTLY DISSIPATING HEAT

(75) Inventor: Koji Aiba, Fujisawa (JP)

(73) Assignee: Canon Kabushiki Kaisha (JP)

( * ) Notice: Subject to any disclaimer, the term of this patent is extended or adjusted under 35 U.S.C. 154(b) by 5 days.

(21) Appl. No.: 13/193,737

(22) Filed: Jul. 29, 2011

(65) Prior Publication Data

US 2012/0039043 A1     Feb. 16, 2012

(30) Foreign Application Priority Data

Aug. 16, 2010   (JP) ................................ 2010-181721

(51) Int. Cl.
  *G03B 17/02*         (2006.01)
(52) U.S. Cl.
  USPC .......................................................... 396/535
(58) Field of Classification Search
  USPC .......................................................... 396/535
  See application file for complete search history.

(56) References Cited

U.S. PATENT DOCUMENTS

| | | | |
|---|---|---|---|
| 4,470,002 A * | 9/1984 | Brown | 361/722 |
| 8,207,489 B2 * | 6/2012 | Aiba | 250/239 |
| 2003/0057470 A1 * | 3/2003 | Taniguchi et al. | 257/303 |
| 2005/0179813 A1 * | 8/2005 | Fujii et al. | 348/375 |
| 2008/0055860 A1 * | 3/2008 | Taniguchi et al. | 361/704 |
| 2009/0002549 A1 * | 1/2009 | Kobayashi | 348/374 |
| 2010/0059664 A1 * | 3/2010 | Aiba | 250/238 |
| 2010/0165574 A1 * | 7/2010 | Iwata et al. | 361/699 |

FOREIGN PATENT DOCUMENTS

JP    2003-008956 A    1/2003

* cited by examiner

*Primary Examiner* — Rodney Fuller
(74) *Attorney, Agent, or Firm* — Rossi, Kimms & McDowell LLP

(57) ABSTRACT

An image pickup apparatus which is capable of suppressing by efficiently dissipating heat generated by an electronic device through transmission of the heat to a heat dissipating member without adding a new member to the image pickup apparatus. A CPU 2 generates heat during operation. An aluminum electrolytic capacitor 12 stores electric energy. A lens barrel 6, a battery compartment 25, and a tripod mounting screw 20 are thermally coupled to the aluminum electrolytic capacitor 12. A heat conductive member 1 is disposed between the CPU 2 and the aluminum electrolytic capacitor 12, for thermally coupling the CPU 2 and the aluminum electrolytic capacitor 12.

8 Claims, 5 Drawing Sheets

IMAGE PICKUP APPARATUS CAPABLE OF EFFICIENTLY DISSIPATING HEAT

BACKGROUND OF THE INVENTION

1. Field of the Invention

The present invention relates to an image pickup apparatus, such as a digital camera, which is provided with a strobe light emitter.

2. Description of the Related Art

For an image pickup apparatus, such as a digital camera, the amount of data to be processed thereby has become large due to an increased pixel density of an image pickup device and provision of a high-speed consecutive shooting function and a high-frame rate moving image-shooting function, and the image pickup apparatus is required to process the data in a short time. This increases load on a CPU of the image pickup apparatus, which results in the inconvenience of a larger amount of heat generated by a circuit board on which the CPU is mounted. Further, while reducing the size of the image pickup apparatus, the area of a gripping part thereof is made as wide as possible so as to make it easier for a user to hold the gripping part during shooting. Accordingly, the circuit board on which are mounted electronic components including the CPU and other ICs is often disposed toward the gripping part where an area for the circuit board can be easily secured. With this arrangement, the heat generated by the circuit board makes the temperature of the exterior of the image pickup apparatus very high, which causes an odd sensation in the user who holds the image pickup apparatus.

In view of this, there has been proposed a digital camera in Japanese Patent Laid-Open Publication No. 2003-008956, in which a circuit board having a heat generating element mounted thereon is disposed on a side of the digital camera toward a gripping part thereof, and a heat dissipating plate is brought into contact with a casing of the heat generating element mounted on the circuit board. In the proposed digital camera, the heat dissipating plate brought into contact with the casing of the heat generating element is extended into a space on a side of the digital camera remote from the gripping part by making a detour around the bottom of a lens barrel, and a heat-insulating sheet is disposed between an extended portion of the heat dissipating plate and an exterior cover on a front side.

SUMMARY OF THE INVENTION

The present invention provides an image pickup apparatus which suppresses a local temperature increase by efficiently dissipating heat generated by an electronic device through transmission of the heat to a heat dissipating member without adding a new member to the image pickup apparatus.

The present invention an image pickup apparatus comprising an electronic device that generates heat during an operation thereof, a capacitor configured to store electric energy, a heat dissipating member configured to be thermally coupled to said capacitor, and a heat conductive member disposed between said electronic device and said capacitor, and configured to thermally couple said electronic device and said capacitor to each other.

According the present invention, it is possible to transmit the heat generated by the electronic device to the heat dissipating member without adding a new member to the image pickup apparatus.

The features and advantages of the invention will become more apparent from the following detailed description taken in conjunction with the accompanying drawings.

DESCRIPTION OF THE EMBODIMENTS

The present invention will now be described in detail below with reference to the accompanying drawings showing embodiments thereof.

Figure 1A:
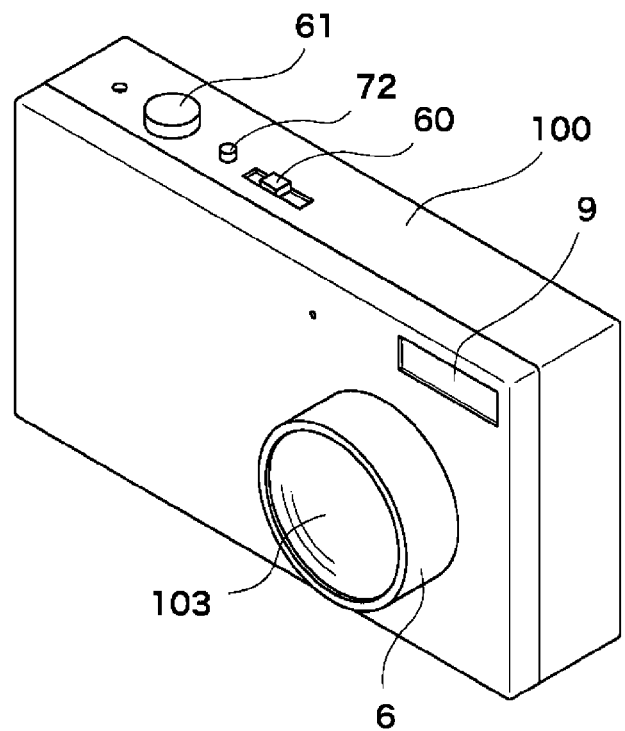
FIG. 1A is a perspective view of the appearance of a digital camera as viewed from a front side thereof.
Figure 1B:
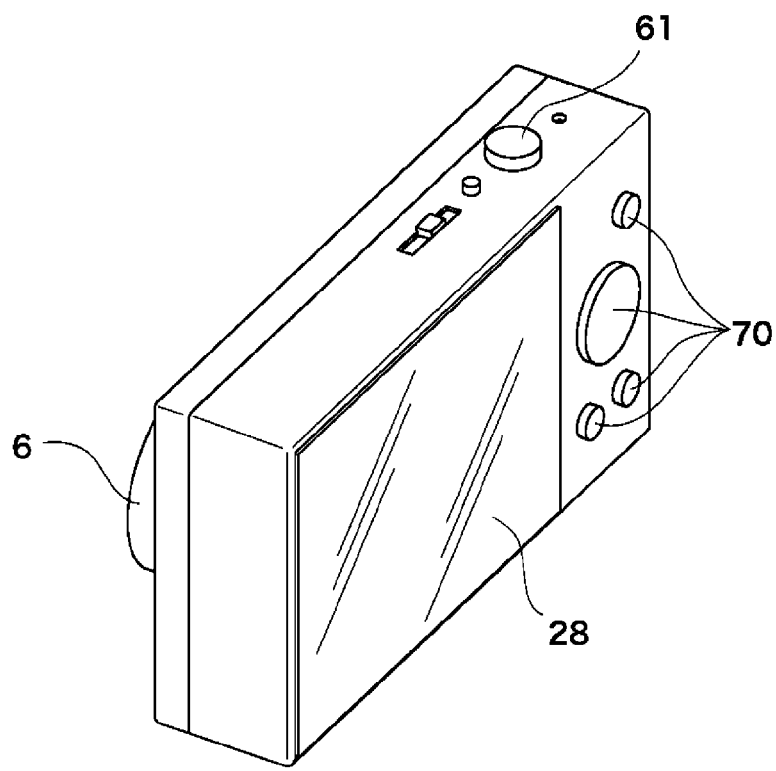
FIG. 1B is a perspective view of the appearance of the digital camera as viewed from a rear side thereof.

FIGS. 1A and 1B are perspective views of the appearance of a digital camera as an image pickup apparatus according to an embodiment of the present invention, in which FIG. 1A is a perspective view of the appearance of the digital camera as viewed from a front side thereof, and FIG. 1B is a perspective view of the appearance of the digital camera as viewed from a rear side thereof.

Referring to FIG. 1A, the digital camera 100 according to the present embodiment has a lens barrel 6 for holding a lens 103 provided toward the front (object side) at a location on the right side of a central portion thereof in the left-right direction, as viewed in FIG. 1A. A strobe light emitter 9 is provided above the lens barrel 6 in the upper right corner of the front side. A shutter button 61, a power switch 72, and a mode switching switch 60 are provided on the top surface of the digital camera 100. The shutter button 61 is disposed on the left side of the central portion of the digital camera 100 in the left-right direction. The exterior of the digital camera 100 toward the shutter button 61 is formed as a gripping part gripped by a user when the user presses the shutter button 61 during shooting. Further, as shown in FIG. 1B, an image display section 28, such as an LCD (liquid crystal display), is provided on a rear side of the digital camera 100, and a console section 70 comprising various operation buttons is provided beside the image display section 28.

Figure 2:
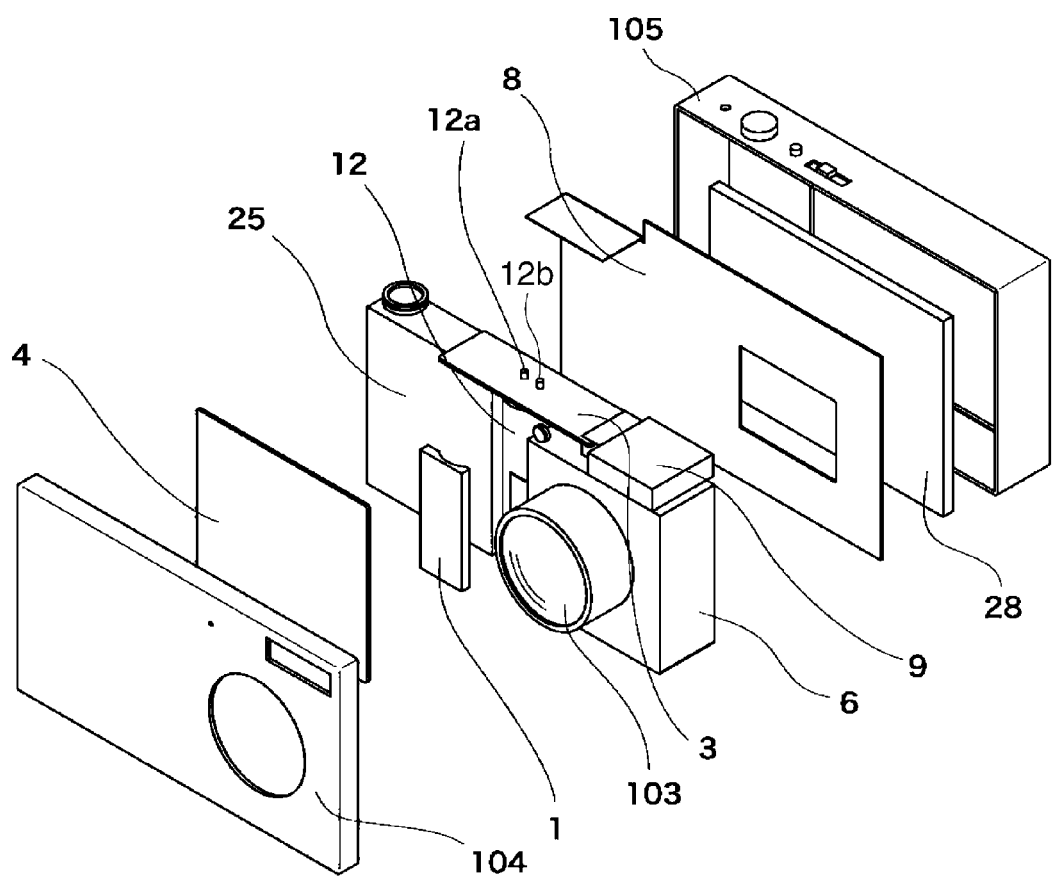
FIG. 2 is an exploded perspective view of the digital camera as viewed from the front side thereof.
Figure 3:
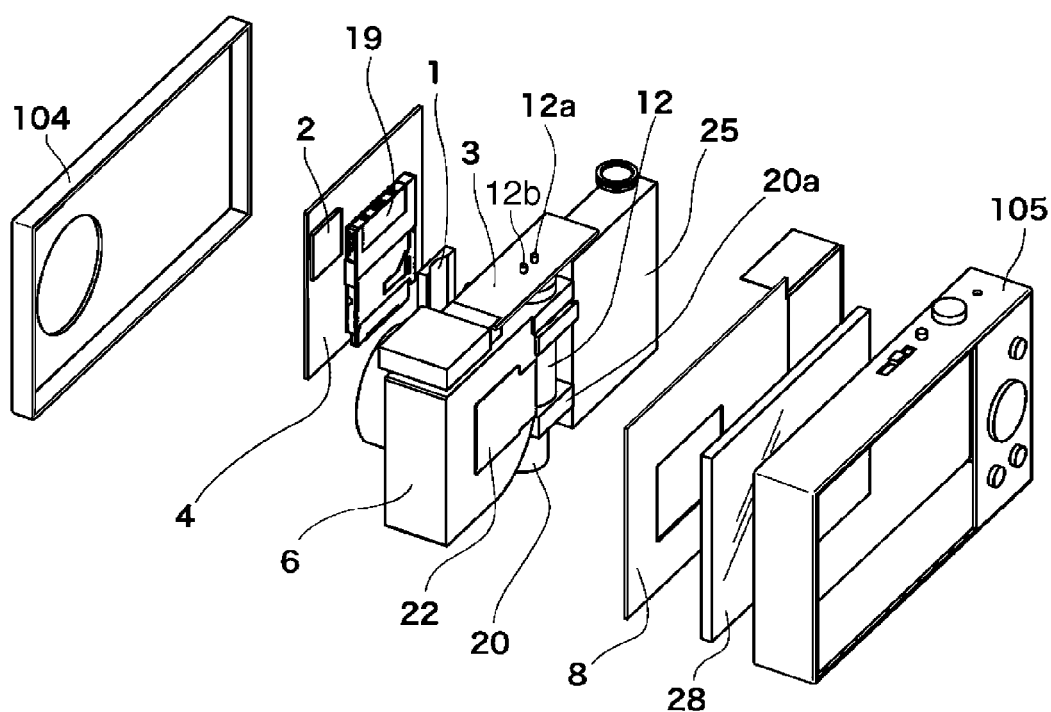
FIG. 3 is an exploded perspective view of the digital camera as viewed from the rear side thereof.
Figure 4A:
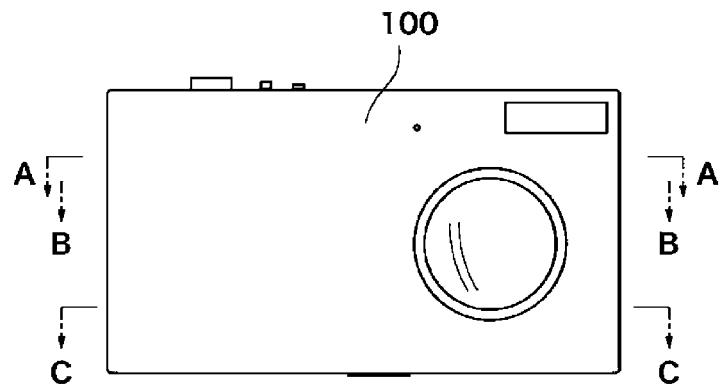
FIG. 4A is a front view of the digital camera.
Figure 4B:
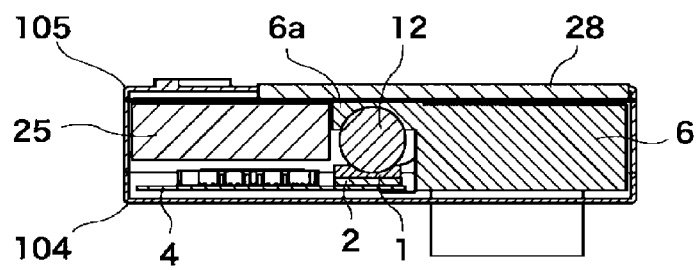
FIG. 4B is a cross-sectional view taken along line A-A of FIG. 4A.
Figure 4C:
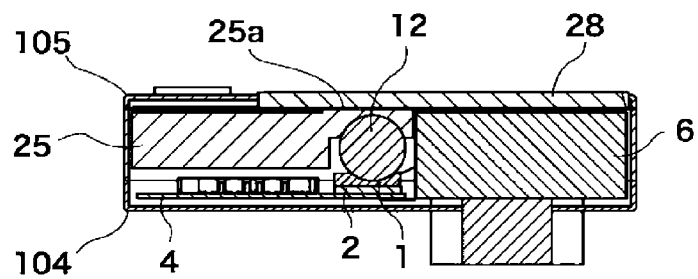
FIG. 4C is a cross-sectional view taken along line B-B of FIG. 4A.
Figure 4D:
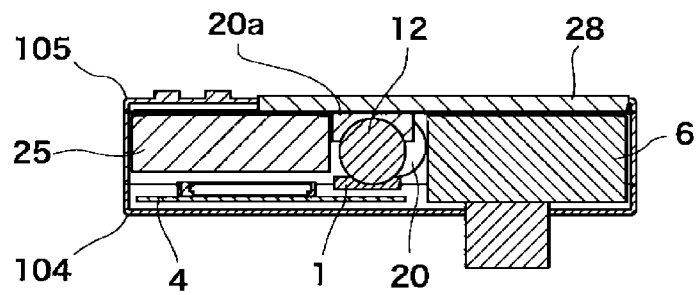
FIG. 4D is a cross-sectional view taken along line C-C of FIG. 4A.

FIG. 2 is an exploded perspective view of the digital camera 100, and FIG. 3 is an exploded perspective view of the digital camera 100, as viewed from the rear side thereof. FIG. 4A is a front view of the digital camera 100, FIG. 4B is a cross-sectional view taken along line A-A of FIG. 4A, FIG. 4C is a cross-sectional view taken along line B-B of FIG. 4A, and FIG. 4D is a cross-sectional view taken along line C-C of FIG. 4A.

As shown in FIGS. 2 and 3, the lens barrel 6 and a battery compartment 25 are arranged between a front cover 104 and a back cover 105. The battery compartment 25 is disposed toward the gripping part mentioned above. The lens barrel 6 and the battery compartment 25 are fixed to a chassis 8 disposed on the rear side of the digital camera 100 e.g. with screws. The image display section 28 is disposed between the chassis 8 and the back cover 105. The image display section 28, the front cover 104, and the back cover 105 are fixed to the chassis 8 with screws, a double-faced tape, and the like.

Further, a main circuit board 4 is disposed between the front cover 104 and the battery compartment 25. A CPU 2 as a heat generating element, and a recording section 19 for accommodating a memory card for recording image signals are mounted on a surface of the main circuit board 4, opposed to the battery compartment 25.

An image pickup section 22 is disposed on a rear side of the lens barrel 6 at a position where an object image having passed through the lens 103 is caused to be formed on an image pickup device. An aluminum electrolytic capacitor 12 for accumulating electric charges necessary for emitting light from the strobe light emitter 9 is disposed between the lens barrel 6 and the battery compartment 25. Further, a tripod mounting screw 20 is disposed at a location toward a lower end of the aluminum electrolytic capacitor 12, and a strobe circuit board 3 having a strobe light emitting circuit (not shown) mounted thereon is disposed at a location toward an upper end of the aluminum electrolytic capacitor 12. The strobe light emitting circuit causes the strobe light emitter 9 to emit light using the electric charges accumulated in the aluminum electrolytic capacitor 12.

Figure 5:
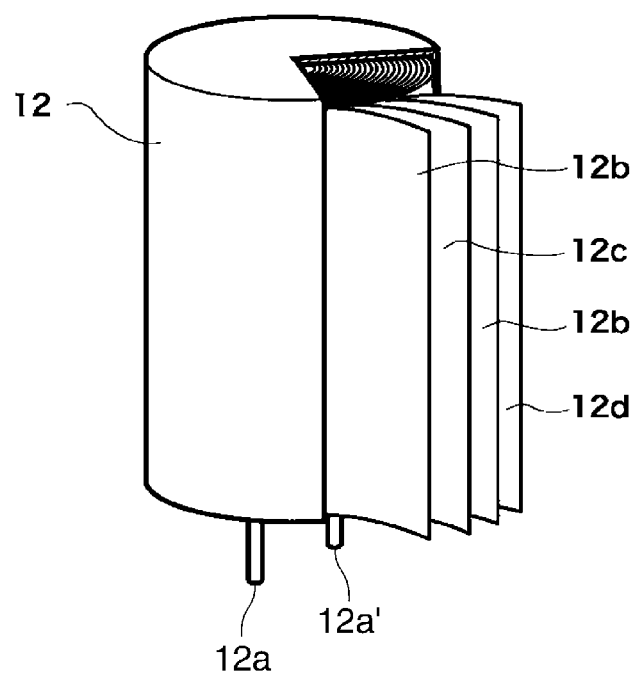
FIG. 5 is a perspective view showing an example of an aluminum electrolytic capacitor.
Figure 6:
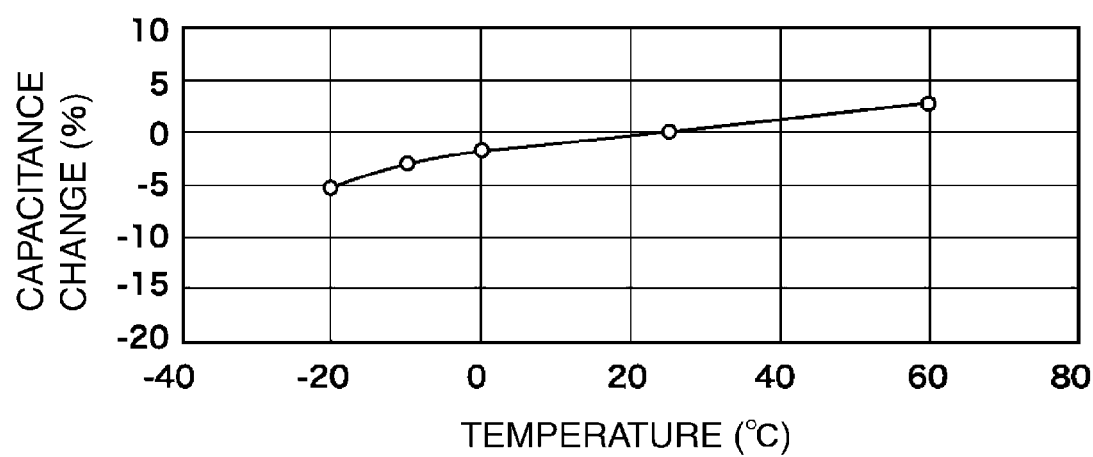
FIG. 6 is a graph showing the relationship between the temperature and the electrostatic capacitance of the aluminum electrolytic capacitor.

Here, as shown in FIG. 5, the aluminum electrolytic capacitor 12 is formed by a roll of electrolytic sheets 12b, a cathode aluminum foil 12c, and an anode aluminum foil 12d. Capacitor terminals 12a and 12a' are connected to the cathode aluminum foil 12c and the anode aluminum foil 12d, respectively. As shown in FIG. 6, the aluminum electrolytic capacitor 12 has a characteristic that the electrostatic capacity thereof decreases as its temperature lowers. Therefore, in the present embodiment, a heat conductive member 1 is disposed between the CPU 2 and the aluminum electrolytic capacitor 12 in a compressed and deformed state. That is, the CPU 2 and the aluminum electrolytic capacitor 12 are thermally coupled by the heat conductive member 1. The heat conductive member 1 is formed by an elastic member, and an elastic heat conductive sheet e.g. of a silicon-based type or an acrylic-based type can be used for the heat conductive member 1. When the heat conductive member 1 is brought into close contact with the CPU 2 and the aluminum electrolytic capacitor 12, heat emitted from the CPU 2 is efficiently transmitted to the aluminum electrolytic capacitor 12 via the heat conductive member 1.

Note that the aluminum electrolytic capacitor 12 receives a reaction force due to the compression and deformation of the heat conductive member 1, and hence the capacitor terminals 12a and 12a' are fixed to the strobe circuit board 3 e.g. by soldering so as to prevent the aluminum electrolytic capacitor 12 from being moved by the reaction force.

Further, in the present embodiment, as shown in FIGS. 4B to 4D, the lens barrel 6, the battery compartment 25, and the tripod mounting screw 20 are formed with respective holding parts 6a, 25a, and 20a for holding the aluminum electrolytic capacitor 12. Therefore, through holding of the aluminum electrolytic capacitor 12 by the holding parts 6a, 25a, and 20a, the lens barrel 6, the battery compartment 25, and the tripod mounting screw 20 are thermally coupled to the aluminum electrolytic capacitor 12.

Further, as shown in FIGS. 4B to 4D, the holding parts 6a, 25a, and 20a hold the aluminum electrolytic capacitor 12 by an opposite surface of the aluminum electrolytic capacitor 12 from a surface thereof with which the heat conductive member 1 is brought into contact. Therefore, the respective contacts between the aluminum electrolytic capacitor 12 and the holding parts 6a, 25a, and 20a are maintained by the reaction force due to the compression and deformation of the heat conductive member 1.

Further, the lens barrel 6, the battery compartment 25, and the tripod mounting screw 20 are formed by die casting of metal, such as zinc, aluminum, or an alloy thereof, and have a high heat dissipation capability. Heat emitted from the CPU 2 is transmitted to the aluminum electrolytic capacitor 12 via the heat conductive member 1, and heat transmitted to the aluminum electrolytic capacitor 12 is transmitted to the lens barrel 6, the battery compartment 25, and the tripod mounting screw 20, each having a high heat dissipation capability, via the holding parts 6a, 25a, and 20a.

As described above, in the present embodiment, heat generated by the CPU 2 mounted on the main circuit board 4 is transmitted to the lens barrel 6, the battery compartment 25, and the tripod mounting screw 20, each having a high heat dissipation capability, via the aluminum electrolytic capacitor 12. This makes it possible to efficiently dissipate heat generated by the CPU 2 to suppress an increase in the temperature of the CPU 2, whereby it is possible to suppress a local temperature increase at a portion of the exterior of the digital camera 100, particularly a local temperature increase of a portion of the front cover 104 covering the gripping part.

Further, in the present embodiment, the temperature of the aluminum electrolytic capacitor 12 is raised by heat transmitted from the CPU 2 thereto via the heat conductive member 1. This makes it possible to prevent the electrostatic capacitance of the aluminum electrolytic capacitor 12 from decreasing under a low-temperature environment, whereby when the digital camera 100 is used under the low-temperature environment, it is possible to ensure a sufficient amount of light emission without a drop in the light-emitting efficiency of the strobe light emitter 9.

Furthermore, in the present embodiment, the heat conductive member 1 is disposed in an existing space between the CPU 2 and the aluminum electrolytic capacitor 12, which makes it possible to ensure the reduction of the thickness of the digital camera 100 without increasing the size of the digital camera 100 in a direction of the thickness thereof.

It is to be understood that the configuration of the present invention is not limited to the above-described embodiment, but the material, shape, size, form, number, and arrangement of the component elements of the present invention can be modified or altered insofar as they do not depart from the subject matter of the present invention.

For example, although in the above-described embodiment, heat generated by the CPU 2 of the main circuit board 4 is transmitted to the aluminum electrolytic capacitor 12 via the heat conductive member 1, by way of example, this is not necessarily required. For example, heat generated by the image pickup device of the image pickup section 22 may be transmitted to the aluminum electrolytic capacitor 12 via the heat conductive member 1.

Further, although in the above-described embodiment, the lens barrel 6, the battery compartment 25, and the tripod mounting screw 20 are formed with the holding parts 6a, 25a, and 20a for holding the aluminum electrolytic capacitor 12, respectively, by way of example, this is not limitative, but even if these holding parts are formed separately from the lens barrel 6, the battery compartment 25, and the tripod mounting screw 20, respectively, and then are fixed to the lens barrel 6, the battery compartment 25, and the tripod mounting screw 20, respectively, it is possible to provide the same advantageous effects as provided as above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2010-181721 filed Aug. 16, 2010, which is hereby incorporated by reference herein in its entirety.

What is claimed is:

1. An electronic apparatus comprising:
an electronic device that generates heat during an operation thereof;
a capacitor configured to store electric energy;
a heat dissipating member configured to be thermally coupled to said capacitor; and
a heat conductive member disposed between said electronic device and said capacitor, and configured to thermally couple said electronic device and said capacitor to each other,
wherein said heat conductive member does not contact said heat dissipating member directly.

2. The electronic apparatus according to claim 1, wherein said heat conductive member is formed by an elastic member, and is disposed between said capacitor and said electronic device in a compressed and deformed state.

3. The electronic apparatus according to claim 1, wherein said heat dissipating member has a holding part formed thereon, for holding said capacitor.

4. The electronic apparatus according to claim 3, wherein said holding part holds said capacitor by an opposite surface of said capacitor from a surface thereof on which said heat conductive member is disposed.

5. The electronic apparatus according to claim 1, wherein said capacitor is an aluminum electrolytic capacitor.

6. The electronic apparatus according to claim 1, wherein said heat dissipating member is a lens barrel, and wherein at least a part of the lens barrel is formed of a metal material.

7. The electronic apparatus according to claim 1, wherein said heat dissipating member is a battery accommodating unit, and wherein at least a part of the battery accommodating unit is formed of a metal material.

8. The electronic apparatus according to claim 1, wherein said heat dissipating member is a tripod mounting section, and wherein at least a part of the tripod mounting section is formed of a metal material.

* * * * *